E. O. BENJAMIN.
ELECTROLYTIC APPARATUS.
APPLICATION FILED JUNE 24, 1918.
1,328,981.
Patented Jan. 27, 1920.
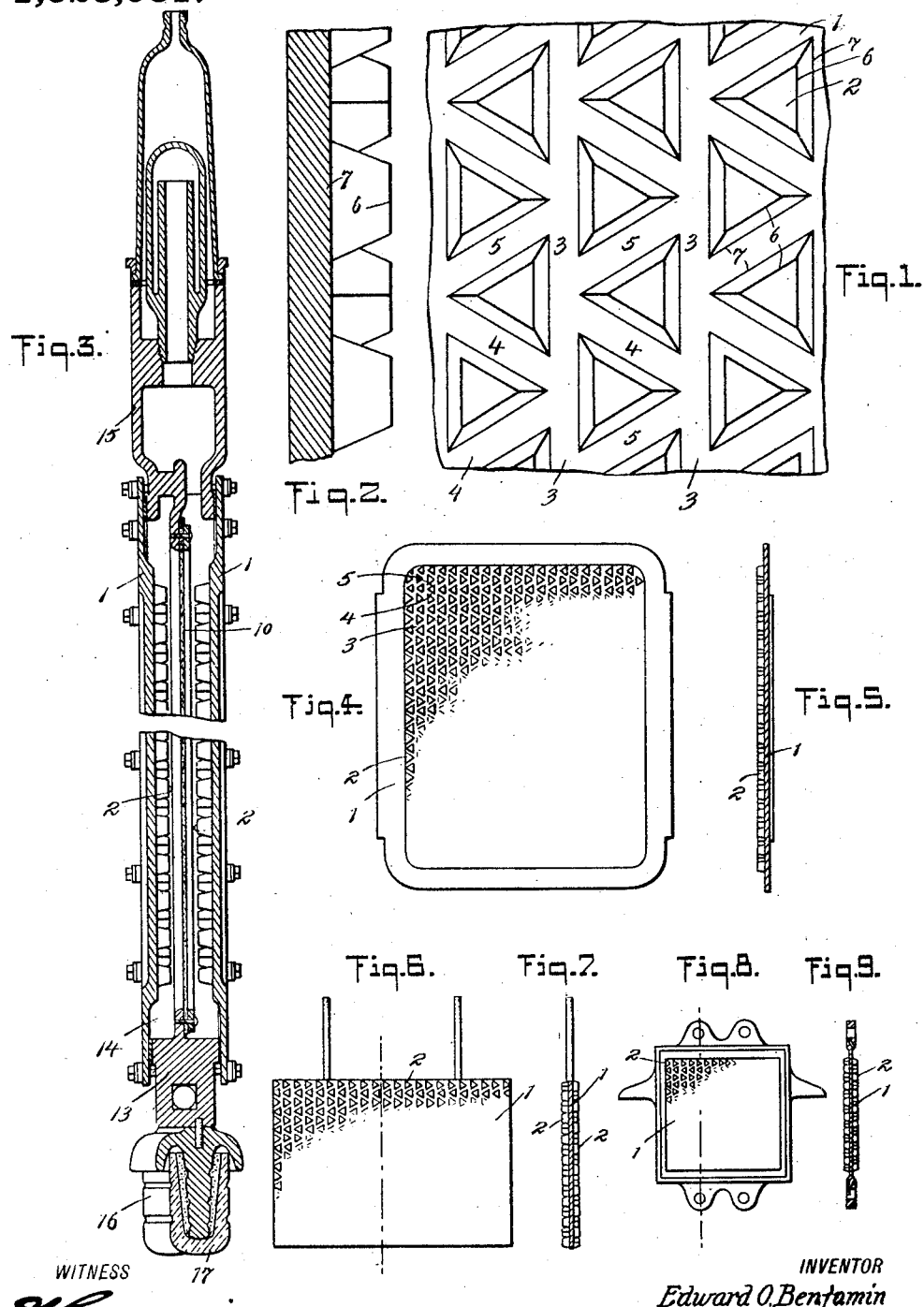
INVENTOR
Edward O. Benjamin
BY
G. C. Dean ATTORNEYS
WITNESS

UNITED STATES PATENT OFFICE.

EDWARD O. BENJAMIN, OF NEWARK, NEW JERSEY.

ELECTROLYTIC APPARATUS.

1,328,981. Specification of Letters Patent. Patented Jan. 27, 1920.

Application filed June 24, 1918. Serial No. 241,510.

*To all whom it may concern:*

Be it known that I, EDWARD O. BENJAMIN, a citizen of the United States, and resident of Newark, in the county of Essex and State of New Jersey, have invented certain new and useful Improvements in Electrolytic Apparatus, of which the following is a specification.

My present invention was devised primarily as an improvement in electrolytic cells of the type shown in my prior application Serial No. 183,828, filed August 1st, 1917, and while particularly applicable to cells of said type, it includes certain features capable of useful application to cells and electrodes of other types where it is desirable to have a large surface of contact with the liquid and particularly where a conducting plate is arranged vertically and is used as an electrode to conduct to the liquid quantities of electricity sufficient to cause bubbles of gas electrolytically produced from the liquid to break loose from the electrode and bubble up through the liquid.

One object of the invention is to increase greatly the surface area of such plates by forming elevations or depressions on the surface thereof without increasing the height of the projections (or depth of the depressions) beyond desired limits.

While my invention may be usefully employed for plates arranged in any position in the liquid, it is adapted particularly for plates arranged vertically, or at least near enough to the vertical so that the rising bubbles tend to follow along the plate or parallel therewith, the arrangement of the projections and depressions being predetermined with special reference to the electrostatic, gravitational and other forces which cause and control the detachment and rise of gas along upright electrode surfaces.

More specifically considered, the invention is adapted for electrolytic cells used for generating oxygen and hydrogen gases for commercial purposes, particularly those wherein the containers for the liquid electrolyte are made very thin and have large vertical electrode surfaces closely confronting an asbestos diaphragm arranged between them. I have discovered that in such apparatus, ribs and other projections as heretofore employed for the purpose of increasing the surface have been so designed that the current flowing from them destroys the asbestos of the diaphragm. I have discovered that this is because they permit a current density so great that it raises the temperature to a point where it destroys the asbestos fibers, probably by driving off the water of crystallization. I have discovered that this is due in part to the fact that the projections are too great a proportion of the total thickness of the body of liquid measured from the bottoms of the depressions on one plate to the bottoms of the depressions on the other plate and the ridges or peaks of the projections are too sharp, it being a well known fact that current density varies inversely as the square of the distance between the electrode surfaces, and that the current flows more readily into the liquid from sharp edges and peaks. By my invention, I avoid concentration of current at the tops of the projections while at the same time, saving space and electrolyte by arranging the electrode surfaces as close as practicable to the intervening asbestos diaphragm.

With this and other objects in view, I employ projections having flat tops and I proportion the projections with reference to the thickness of electrolyte between them so as not to have an undue concentration of current too close to the diaphragm.

The projections are arranged in rows so as to afford upwardly extending, preferably parallel channels between them whereby liquid circulation is promoted and the gas bubbles may readily flow upward to the top of the electrolye, and also channels extending diagonally to facilitate flow of the bubbles into the vertical channels and to permit lateral as well as vertical equalization of pressure at any point where a large amount of gas may momentarily accumulate. The pyramids are preferably so spaced that a large fraction of the main surface of the plate, say one-third to one-half, will afford wide flat bottoms for the channels thus affording ample space for flow of the liquid and bubbles therein.

The oblique channels are short and are preferably inclined about 30° from the horizontal. They are preferably not alined like the vertical channels but are staggered so that the upper end of each oblique channel intersects an upward channel at a point opposite a projection in an adjacent row, so that lateral flow along the oblique channels will be deflected into the upward channels thereby tending to bring the gases to the upper surface of the electrolyte with the least possible resistance. Moreover, half of the oblique channels slant toward one side of the tank and the other half toward the other side so that sudden accumulations of gas, though readily equalizing themselves laterally, will not tend to set up a sudden rush toward one side of the tank.

I preferably make the flat topped projections as pyramid frustums, that is, they are shaped like pyramids with the tops cut off, preferably at between one-third and two-thirds, or say about half the altitude of a complete pyramid. I also make the pyramid frustums triangular since this shape best lends itself to forming continuous upward channels and staggered oblique channels. Preferably, also, I make them frustums of equilateral triangle pyramids because I have found that this gives the largest amount of surface with the smallest amount of metal. The total area of an electrode having the pyramid frusta proportioned and arranged as shown in the drawing, is substantially double that of an electrode having a flat surface. The gain in area is due to the sides of the pyramids, there being no gain from the flat channel bottoms which cover nearly half the plate nor from the flat pyramid tops which cover nearly one-sixth of it.

This doubling of the area will result from the pattern shown in the drawings regardless of the size or scale on which it is executed, but I prefer to select a scale which will make the channels wide enough for free circulation of liquid and ready escape of the gas bubbles, thereby insuring continuous activity and gas production over the entire surface. This depends upon obscure factors controlling the generation, detachment and rising of the bubbles in the liquid but in practice, I find that the channels should be about ¼ inch wide at the bottom by about ½ inch high and about ½ inch wide at the top. On this basis, equilateral triangle pyramid frustums will be about one inch on a side by about ½ inch high, the convergence of the sides from base to top being such as would make the pyramid, if completed, 1¼ inch from base to top.

My invention also includes electrodes having their surface increased by employment of flat topped projections having any or all of the above features, in combination with a thin flat sided cell in which said electrode surfaces are submerged with an asbestos diaphragm interposed midway between them. In such combination, the novelty consists in proportioning the parts and spacing the electrodes so that the opposite electrode surfaces on the tops of the projections are spaced apart a substantial fraction of the distance separating the main electrode surfaces at the bottoms of the channels, say one-third to three-quarters that distance. If the tops are half as far apart as the bottoms, the current from the tops will be about four times that at the bottoms of the channels and I have discovered that for such current density, the distance from the diaphragm will be great enough to avoid danger of injuring the asbestos fibers. Moreover, the diaphragm will be far enough from the electrode surfaces so that the bubbles repelled therefrom by electrostatic action are not in danger of being driven through the diaphragm and hence the oxygen generated on the one side of the diaphragm and the hydrogen generated on the other side of the diaphragm are not in danger of becoming mixed.

The action seems to be somewhat as follows:—The gases as generated by the current collect as bubbles on the electrode surfaces and being charged with electricity of the same sign as the electrode on which they are generated, the bubbles are driven outward toward the asbestos diaphragm, then the electrostatic charges becoming neutralized or of opposite sign, the bubbles tend to eddy back into the channels in which they flow upward to the surface of the electrolyte. The current density and resulting generation of bubbles at the bottoms of the channels being say one quarter to one third that near the tops of the projections, the electrolyte adjacent the bottoms is less disturbed and affords easier paths of escape for the bubbles.

A desirable embodiment of all the above described features of my invention is shown in the accompanying drawings, in which—

Figure 1 shows a face view and Fig. 2 a vertical section of a portion of electrode plate embodying the preferred features of configuration, relative arrangement and sizes of projections and channels;

Fig. 3 is a vertical section of an electrolytic cell embodying my invention;

Figs. 4 and 5 are respectively face and edge views of the electrode plates shown in Fig. 3;

Figs. 6 and 7 are face and edge views showing my invention as applied to double faced electrode plates of a well-known type adapted to be suspended in a tank; and Figs. 8 and 9 are similar views showing my invention applied to double faced electrodes of the well-known "bi-polar" type.

All of the above described features of configuration of electrode surfaces are shown as combined in Figs. 1 and 2.

The plate 1 is provided with projections having flat tops 2 arranged in rows so as to form the vertical channels 3, 3; also the oblique channels 4, 4 slanting toward one edge of the plate, and an equal number of similar channels 5, 5, slanting toward the other edge of the plate. The projections are triangular pyramid frustums with equal sides spaced apart so as to form the said channels and to have the oblique channels intersect the vertical channels opposite the flat side of a projection forming the other side of the same vertical channel. Obviously a similar arrangement of the vertical and oblique channels could be obtained with triangular frustums which are not equilateral. Obviously also pyramid frustums other than triangular may be patterned so as to embody some of the principles and give some of the good results hereinbefore explained.

The plates may have the projections attached thereto in any desired way but I prefer to roll or preferably cast them integral with the plates the form of the projections being such as to make either method practicable.

The above configuration may be applied to one side of plates intended to serve as side walls of an electrolytic cell as in Figs. 3, 4 and 5 or to both sides of an electrode as in Figs. 6, 7, 8 and 9.

Figs. 6 and 7 show a well-known form of electrode plate adapted to be suspended in a tank where both sides of the plate are of the same polarity.

In Figs. 8 and 9 both sides of the plate are employed but the plates are intended to be employed in series after the manner shown in Patent to Levin No. 1,094,728 so that the current flows into one surface of the plate and out through the other surface of the plate, thereby making one a cathode and the other an anode.

The preferred application of my invention is illustrated in Figs. 3, 4 and 5, the particular configuration of pyramid frustums above described being especially adapted for a special arrangement in cells which are made thin and are set on edge so as to require only a small body of electrolyte and so as to occupy but little space. In said Fig. 3, the electrode plates 1, 1, closely confront each other with a diaphragm 10 arranged midway between them. The spacing of the electrodes is determined with reference to the height of the flat topped projections so that the flat tops 2 are at least half as far apart and have at least half as much electrolyte between them as the bottoms of the channels 4, 5. Thus arranged, the flat tops will have a current density not greater than four times that of the bottom of the grooves and the flat tops are normally about ½ inch from the asbestos diaphragm. I have discovered that with this design and spacing of the parts, the asbestos diaphragm will not be injured by normal use of the device as a generator for oxygen and hydrogen gases.

The specific means which will be employed for supporting the electrode plates and diaphragm in the desired spaced relation are not important to my invention but as illustrating an operative means, I have elected a construction such as shown in my prior application first above referred to. With respect to its details of construction, it need only be explained that the electrodes 1, 1 are bolted to but suitably insulated from a thin rectangular frame cast with integral bottom 13, sides 14 and top 15, and supported on insulators 16, 17.

While I have explained the relative importance of the various features of my invention which contribute to the desired results, and have specifically stated the limits within which some of them may be varied, it is obvious that other features are capable of being modified, changed or omitted without departure from my invention. For instance, the bottoms of the channels need not be absolutely flat, provided they be flat enough to afford the desired broad bottoms for the channels and to this end it is not necessary that the channel bottoms cover nearly half the plate or the flat tops nearly one-eighth, good results being attainable where the service at and above the plane of the bases of the projections be covered at least one-quarter of the area and that the tops have no acute edges projecting toward the diaphragm, and preferably no points nor acute edges projecting in any direction. These and other features such as the angle of slant of the sides of the pyramid frustums and the slant of the oblique channels may be varied or some of them omitted by those skilled in the art while preserving the advantages to be derived from the new and useful features of my invention which are retained.

I claim:

1. An electrode of the class described, comprising a plate of conducting material having its surface formed or provided with flat-topped projections vertically alined so as to form upward channels between them.

2. An electrode of the class described, comprising a plate of conducting material having its surface formed or provided with flat-topped projections vertically alined so as to form upward channels between them, and also oblique channels between the upward channels.

3. An electrode of the class described, comprising a plate of conducting material having its surface formed or provided with flat-topped projections vertically alined so as to form upward channels between them, and also oblique channels between the upward channels slanting alternately in opposite directions.

4. An electrode of the class described, comprising a plate of conducting material having its surface formed or provided with flat-topped projections vertically alined so as to form upward channels between them, and also oblique channels between the upward channels and staggered so that the oblique channels intersect the vertical channels in line with a projection on the opposite side of such vertical channel.

5. An electrode of the class described, comprising a plate of conducting material having its surface formed or provided with pyramid frustums vertically alined so as to form upward channels between them and also oblique channels between the upward channels.

6. An electrode of the class described, comprising a plate of conducting material having its surface formed or provided with pyramid frustums vertically alined so as to form upward channels between them and also oblique channels between the upward channels and staggered so that the oblique channels intersect the vertical channels in line with a projection on the opposite side of such vertical channel.

7. An electrode of the class described, comprising a plate of conducting material having its surface formed or provided with triangular pyramid frustums vertically alined so as to form upward channels between them and also oblique channels between the upward channels.

8. An electrode of the class described, comprising a plate of conducting material having its surface formed or provided with triangular pyramid frustums vertically alined so as to form upward channels between them and also oblique channels between the upward channels and staggered so that the oblique channels intersect the vertical channels in line with a projection on the opposite side of such vertical channel.

9. An electrode of the class described, comprising a plate of conducting material formed or provided with straight sided projections covering not less than one-third nor more than two-thirds of its area, said projections being regularly arranged and spaced apart to form, with the main surface of the electrode, wide bottomed, open-topped channels for circulation of the electrolyte.

10. An electrode of the class described, comprising a plate of conducting material having its surface formed or provided with projections in the form of equilateral triangle pyramid frustums with one side of each frustum arranged vertically and with adjacent non-vertical sides of alternate frustums parallel with each other so as to form continuous vertical channels and also short oblique channels connecting the vertical channels, slanting alternately in opposite directions and each having its upper end in alinement with the vertical side of a pyramid frustum on the opposite side of said vertical channel for the purpose described.

11. In an electrolytic cell of the type described, coöperating electrodes having flat topped projections arranged to afford vertical channels extending toward the top of the cell, in combination with an asbestos diaphragm and means for supporting said diaphragm and electrodes parallel with and midway between the electrodes, the flat tops of the respective electrodes being spaced apart a distance at least as great as their combined height, for the purpose described.

Signed at New York city, in the county of New York and State of New York, this 21st day of June, A. D. 1918.

EDWARD O. BENJAMIN.